April 29, 1941.  R. NEUHAUS  2,239,826
TOOL JOINT
Filed July 15, 1940
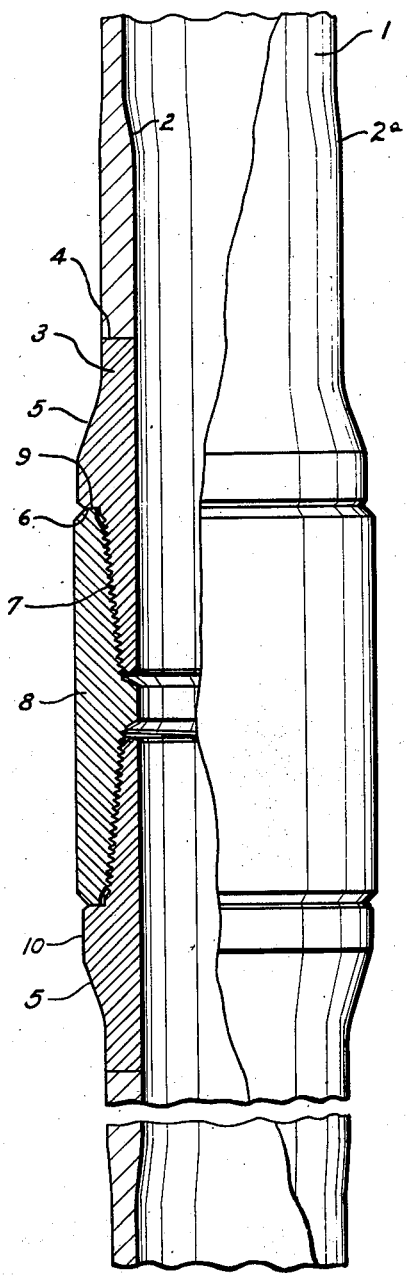
Ralph Neuhaus
INVENTOR
BY Jesse R. Stone
ATTORNEY Patented Apr. 29, 1941

2,239,826

UNITED STATES PATENT OFFICE 2,239,826

TOOL JOINT

Ralph Neuhaus, Houston, Tex., assignor to Hughes Tool Company, Houston, Tex., a corporation of Delaware Application July 15, 1940, Serial No. 345,460

2 Claims. (Cl. 285—146)

My invention relates to tool joints such as are employed upon drill stems in the drilling of deep wells.

Tool joints of this character are subject to rapid wear. In the rotation of the drill stem in the drilling operation the outer surface of the tool joints bears against the casing or the wall of the well, and, in rotation, is subject to abrasion and wear. As a consequence the joint, being of larger diameter than the pipe, wears rapidly and finally becomes unsafe to use and has to be discarded. The shoulders at the ends of the tool joints become so worn that the elevator will not hold the pipe.

The ordinary tool joint is long in extent to provide a surface to receive the pipe tongs employed in screwing up or unscrewing the joints. Even where the joint is made integral with the pipe a length of about six inches is provided for engagement by the pipe tongs. This portion has at the end thereof a shoulder which may be a tapered shoulder to be engaged by the elevator employed in lifting the pipe. This shoulder is spaced from the end of the pipe and is subject to wear which gives the joint a barrel shape, destroying the elevator shoulder.

When the tool joints and the shoulders on the pipe become so worn that they are no longer safe the outer surface which has been worn away can be built up by welding to produce an outer diameter of the original proportions. However, this is an expensive job and the results are not always satisfactory.

Also, the tool joints may be removed, the shoulders on the pipe built up again, and thus also renewing the outer surface of the pipe so that the joint is again ready for use. Due to the time consumed and the expense of such operation it is desirable to have a tool joint which may be cut away and discarded and a new one substituted.

It is an object of my invention to provide a tool joint which is welded to the pipe at a point where the elevator shoulder can be discarded when a new joint is substituted and thus again obtain a new joint of the same character as the original one.

I aim to provide an elevator shoulder upon the joint at a point closely spaced from the sealing shoulder thereon where it will be protected by the coupling member to some extent, and thus also leaving space on the upset portion of the pipe for engagement by the pipe tongs.

I desire to form an outer diameter upon the pipe which will take the wear in the drilling of the well and which may be renewed so as to provide not only a new joint but a new shoulder for the elevator.

The invention will be better understood by reference to the drawing herewith wherein I have shown a joint between two sections of drill pipe, said joint being constructed in accordance with this invention.

The pipe sections 1 have walls of uniform thickness except adjacent the end where the pipe has an interior upset 2, making the wall at this point thicker than the normal thickness of the pipe wall. There is also a light external upset at 2ª but the upset may be wholly internal or external, as desired. To the end of the upset pipe end I weld, preferably by electric flash welding, a tool joint member 3. This is the pin member of the joint. It is welded to the pipe along the line 4. Beyond the weld line the joint member may be of uniform diameter for a short distance and is then flared outwardly at 5 to provide an elevator shoulder. While a tapered elevator shoulder, as shown, is preferred, a square shoulder could obviously be substituted for use when this type of elevator is to be used. Beyond this shoulder the wall thickness is decreased abruptly at 6 to form a sealing shoulder for the coupling member, and beyond the shoulder 6 the pin portion of the joint is tapered and threaded at 7 to engage with the coupling member 8.

The coupling member 8 is a double-ended box. Its ends are machined off to form a shoulder 9 to engage against the shoulder 6 upon the tool joint and form a sealing engagement therewith. The outer diameter of the coupling member 8 is somewhat greater than that of the tool joint pins so that a larger proportion of the wear on the exterior of the joint is taken up in the coupling member itself. Thus the outer diameter of the pin member at 10 is not rapidly worn because it is close to the coupling 8 which takes most of the wear. Being short, less metal is used, and expense thus avoided.

It will be obvious that the pin member of the joint may be unscrewed from the coupling member which may remain upon the upper end of the next lower section. The wall of the pipe and tool joint adjacent the weld line is thick enough to take the pipe tongs and no tong surface on the joint itself is necessary. Whenever the joint becomes sufficiently worn that the elevator shoulder 5 below the coupling is no longer of sufficient outer diameter to engage safely with the elevator it will become necessary to remove the joint. Where the weld is made sufficiently close to the elevator shoulder 5 it will be possible to cut off the tool joint from the pipe, preferably at a point on the joint member spaced somewhat from the weld line 4 on the tool joint pin, to provide metal which may be burned away in the flash welding of a new joint to the upset pipe end 2. The new joint may thus be welded in place of the old and worn joint and a new coupling member 8 may be substituted for the old, and the pipe and joint are then substantially the same as when the joint was new. The new joint provides a new tool joint shoulder, thus making it unnecessary to build up any portion of the joint by surface welding.

This is a comparatively inexpensive means of maintaining the joint in operative condition due to the fact that the pin member 3 of the joint is comparatively short and may be removed from the end of the pipe section with an ordinary cutting torch. The structure is hence economical and the substitution of a new joint for the old is a fairly simple operation, performed at a comparatively small cost to the operator.

The life of the pin member will be prolonged because the short portion 10 or larger diameter is close to the coupling member, which takes most of the wear. Also, the internal upset on the pipe provides a strong area on the pipe to receive the pipe tongs without any other special provision.

What is claimed as new is:

1. A drill stem section, short pin members on said section at each end thereof, a sealing shoulder on each of said members, a tapered and threaded pin on the extremity of said section beyond each of said shoulders, an elevator on each member spaced closely to said sealing shoulder and tapered in a direction away from said threaded end, and a coupling member of larger external diameter than said pin members adapted to receive wear incident to operation and threaded to engage said pin members and sealing with said shoulders.

2. A drill stem section having pin members at each end, each of said pin members including a cylindrical area of comparatively large external diameter and heavy wall thickness, a neck on said member secured to said section, an elevator shoulder between said cylindrical area and said neck, a radial shoulder on the end of said area remote from said neck, a tapered pin adjacent said shoulder threaded to engage a coupling, a coupling member of larger external diameter than said cylindrical area adapted to receive wear incident to operation, tapered sockets in each end of said coupling threaded to engage said pin, and a sealing shoulder at both ends of said coupling to contact said radial shoulder when said pin member is screwed therein, said cylindrical area being short compared with said coupling and adapted to be protected from wear thereby.

RALPH NEUHAUS.

CERTIFICATE OF CORRECTION.

Patent No. 2,239,826. April 29, 1941.

RALPH NEUHAUS.

It is hereby certified that error appears in the printed specification of the above numbered patent requiring correction as follows: Page 2, second column, line 4, claim 1, after "elevator" insert the word --shoulder--; and that the said Letters Patent should be read with this correction therein that the same may conform to the record of the case in the Patent Office.

Signed and sealed this 3rd day of June, A. D. 1941.

(Seal)

Henry Van Arsdale,
Acting Commissioner of Patents.